United States Patent Office 3,728,226
Patented Apr. 17, 1973

3,728,226
BLOOD SERUM ANALYTICAL CONTROL
STANDARD
Allan L. Louderback, Temple City, Calif., assignor to
Baxter Laboratories, Inc., Morton Grove, Ill.
No Drawing. Filed June 1, 1970, Ser. No. 42,597
Int. Cl. C12k 1/04
U.S. Cl. 195—103.5 R    1 Claim

ABSTRACT OF THE DISCLOSURE

A control standard for the analytical determination of multiple blood serum components consisting of a mixture of at least three of said blood serum components having their respective concentrations indiscriminately predetermined by random selection from the range of lowest to highest levels of each said component established by instrumentation parameters and clinical significance.

---

This invention relates to a control standard and method for the analysis of blood serum and, more particularly, to an improved control standard and method for controlling the accuracy of blood serum values determined by automated or manual analytical procedures.

Blood serum is a complex biological fluid containing numerous components of substantial physiological importance. In the normal or average healthy person the concentrations of these components will fall within certain reasonably well-defined limits. When one or more of these components is determined upon analysis to fall outside of these acceptable limits, various diseases or pathological conditions of the body systems are indicated.

In recent years various automated procedures have been developed for conveniently analyzing multiple components of blood serum. Illustrative of the analytical equipment for these purposes are the Technicon "AutoAnalyzer," the Warner-Chilcott "Robot Chemist" and the Beckman "Discrete Analyzer." These instruments are capable of rapidly and sequentially determining the concentrations of a host of blood serum components in a single sample, for example, up to a dozen or more values.

The accuracy in the analysis of the blood serum components in the foregoing automated procedures, as well as in manual determinations, is dependent, in part, upon the accuracy of the concentration values assigned to the control or reference standards used for comparison with the unknown samples. In making the foregoing analytical determinations it has been common practice to provide the clinical or laboratory technician with from one to about three types of control or reference sera for comparison with the unknown sera being tested. These control standards have usually been defined as average serum, or as normal and abnormal sera such as high, low and medium sera. In use of an average control serum, the analyst makes a comparison between the values determined for the unknown sample and the values assigned to the average control serum. If the determined values fall outside of an acceptable range of deviation from the average control serum, they are considered to be abnormal values. In the use of multiple control standards, the unknown sample is characterized in terms of the control sample which it most closely resembles. Illustrative of the control standards used in actual practice is the freeze dried serum described in U.S. Pat. 3,466,249.

Heretofore, it has been conventional practice to supply the user of these control standards with the actual analytical values of the samples. Consequently, there has been no completely satisfactory way to adequately check or vertify the precision of the person making the analysis. The laboratory technician may consciously or unconsciously interpret results to fall within the correct range when in fact they are outside that range.

The present invention provides an improved control standard and method of controlling the accuracy of blood serum values in automated or manual procedures. In accordance with this invention, concentrations of multiple components (at least three components) of blood serum for the control standards are each indiscriminately predetermined by random selection from the range of lowest to highest levels of each previously established by instrumentation parameters and clinical significance for these components.

The control standard prepared according to this invention can comprise a multiple of blood serum components in jumbled concentrations each of which is indiscriminately selected by any conventional method of random selection. Random number tables can be used or a computer random number generation system can be used to select a number from the lowest to highest concentration for each component, each being selected independently of each other.

Thus, the control standard can contain high concentrations of certain components, low concentrations of certain other components, and medium concentrations of still other components. The control samples can then be coded and the assigned concentration values made available to the laboratory director or supervisor for checking and comparing with the results obtained by the analytical technician for the unknown samples, used as a blind study control.

The control standard employed according to this invention can be in a dry or liquid form. When in a dry form, it is reconstituted with liquid, for example, water, prior to use. A preferred method of drying is conventional freeze drying or lyophilization of the liquid sample.

Illustrative of the blood serum components which can be included in a control standard of this invention are substances selected from the group consisting of albumin, acid phosphatase, alkaline phosphatase, amylase, bilirubin, calcium, carbon dioxide, chloride, cholesterol, creatinine, glucose, hemoglobin, lactic dehydrogenase, phosphorous, potassium, sodium, total protein, transaminase such as serum glutamic oxalacetic transaminase and serum glutamic pyruvic transaminase, triglycerides, urea nitrogen, uric acid and other such substances found in blood sera.

The following examples will further illustrate the present invention although the invention is not limited to these specific examples.

EXAMPLE 1

Human blood serum from a serum pool is filtered to remove particulate matter. The serum is then mixed with a polystyrene nuclear sulfonic acid ion exchange resin on the hydrogen cycle ("Dowex–50," 50 to 100 mesh) in the ratio of 40 grams of resin per liter of serum to reduce the sodium and potassium ion level of the serum. As the hydrogen ion is released into the serum by the exchange for sodium and potassium ions, the pH of the serum is maintained at its original level by the presence of sufficient tris buffer or lithium hydroxide. The sodium ion level is reduced by this ion exchange treatment from a range of about 145 to 150 mg./liter of serum to a range of about 90 to 95 mg./liter of serum. The pH of the treated serum is then adjusted to 6–6.5 with tris buffer or lithium hydroxide or, if acid is needed, with sulfuric acid.

The resin treated serum is then analyzed for seventeen components and the concentrations of these components are adjusted to levels determined by random selection from the range of the lowest to highest levels of each as set forth in Table I below:

TABLE I

| Component | Lowest level | Highest level | Units |
|---|---|---|---|
| Sodium | 130 | 165 | Milliequivalents/liter. |
| Potassium | 3 | 8 | Do. |
| Chloride | 105 | 130 | Do. |
| Phosphorus | 3.0 | 15 | Milligrams/100 ml. |
| Calcium | 5 | 14 | Do. |
| Blood Urea Nitrogen (BUN). | 11 | 80 | Do. |
| Uric acid | 5 | 12 | Do. |
| Creatinine | 1 | 7 | Do. |
| Glucose | 65 | 400 | Do. |
| Cholesterol | 165 | 275 | Do. |
| Bilirubin | 0.5 | 2 | Do. |
| Total protein | 5.5 | 7.2 | Grams/100 ml. |
| Lactic dehydrogenase (LDH). | 400 | 2,400 | Spectrophotometric units. |
| Amylase | 65 | 400 | Somogyi units. |
| Acid phosphatase | 0.4 | 3 | Bessey-Lowry-Brock units. |
| Alkaline phosphatase | 1.5 | 7 | Do. |
| Protein bound iodine (PBI). | 4.8 | 10.2 | Micrograms/100 ml. |

The range of lowest to highest level of each of the foregoing components is established by instrumentation parameters and clinical significance. That is, these levels are representative of the lowest (or relatively low) and highest (or relatively high) levels of the respective components readable on conventional analytical instruments made and used for the clinical analysis of blood serum, for example, the Technicon "AutoAnalyzer," the Warner-Chilcott "Robot Chemist," the Beckman "Discrete Analyzer" and the Hycell "Mark X." Instruments of this type are illustrated, for example, in U.S. Pats. 2,797,149; 3,193,358; 3,193,359; 3,241,432; and references cited therein.

Other representative lowest (or relatively low) and highest (or relatively high) levels of clinical significance for these blood serum components can be ascertained by reference to a general text such as Richterich, "Clinical Chemistry," Academic Press, New York and London, 1969, and Henry, "Clinical Chemistry: Principles and Techniques," Harper & Row, New York, 1964.

The above-prepared resin-treated and analyzed serum is sufficiently dilute so that the randomly selected concentration levels of the components can be satisfied by addition of appropriate amounts of these components to the serum as necessary. In three different runs, concentration values within the foregoing range of lowest to highest levels of each component were selected by a computer random number generation system as set forth in Table II, below:

TABLE II [1]

| Component | Run 1 | Run 2 | Run 3 |
|---|---|---|---|
| Sodium | 142.0 | 153.0 | 164.0 |
| Potassium | 3.1 | 3.2 | 6.6 |
| Chloride | 111.0 | 126.0 | 128.0 |
| Phosphorus | 6.0 | 9.2 | 5.1 |
| Calcium | 8.5 | 9.3 | 5.1 |
| Blood urea nitrogen (BUN) | 20.0 | 34.0 | 22.0 |
| Uric acid | 5.8 | 11.0 | 8.7 |
| Creatinine | 1.2 | 6.2 | 1.3 |
| Glucose | 318.0 | 184.0 | 352.0 |
| Cholesterol | 195.0 | 212.0 | 183.0 |
| Bilirubin | 13.8 | 6.7 | 7.1 |
| Total protein | 5.9 | 6.1 | 6.9 |
| Lactic dehydrogenase (LDH) | 851.0 | 581.0 | 1,023.0 |
| Amylase | 131.0 | 84.0 | 216.0 |
| Acid phosphatase | 2.3 | .4 | .7 |
| Alkaline phosphatase | 4.6 | 6.0 | 3.3 |
| Protein bound iodine (PBI) | 7.8 | 7.2 | 5.5 |

[1] Same units as in Table I.

The resin treated serum pool is divided into three parts which are adjusted to satisfy the concentration values shown Runs 1, 2 and 3, respectively. The serum is then refiltered placed in vials and lyophilized. The lyophilized products comprise the final control standards which can then be made available to clinical laboratories and other such analytical and testing laboratories having a need for blood serum control standards.

Various other examples and modifications of the foregoing examples will be apparent to those skilled in the art after reading the foregoing specification and the appended claims without departing from the spirit and scope of the invention. All such further examples and modifications are included within the scope of the invention as defined in the following claim.

What is claimed is:

1. The method of making a control standard for the analytical determination of multiple blood serum components comprising forming a mixture of at least three of said components in which all of the concentrations of the components are indiscriminately predetermined by random selection from the concentration ranges in which
   sodium is about 130–165 milliequivalents/liter,
   potassium is about 3–8 milliequivalents/liter,
   chloride is about 105–130 milliequivalents/liter,
   phosphorus is about 3.0–15 milligrams/100 ml.,
   calcium is about 5–14 milligrams/100 ml.,
   blood urea nitrogen is about 11–80 milligrams/100 ml.,
   uric acid is about 5–12 milligrams/100 ml.,
   Creatinine is about 1–7 milligrams/100 ml.,
   glucose is about 65–400 milligrams/100 ml.,
   cholesterol is about 165–275 milligrams/100 ml.,
   Bilirubin is about 0.5–2 milligrams/100 ml.,
   total protein is about 5.5–7.2 grams/100 ml.,
   lactic dehydrogenase is about 400–2400 Spectrophotometric units,
   amylase is about 65–4000 Somogyi units,
   acid phosphatase is about 0.4–3, Bessey-Lowry-Brock units,
   Alkaline phosphatase is about 1.5–7 Bessey-Lowry-Brock units, and
   protein bound iodine is about 4.8–10.2 micrograms/100 ml.

References Cited

General Diagnostics/Warner-Chilcott, "The Versatol System of Standards-in-Serum" (1963).

ALVIN E. TANENHOLTZ, Primary Examiner

M. D. HENSLEY, Assistant Examiner

U.S. Cl. X.R.

23—230 BIO,